United States Patent
Kim et al.

(10) Patent No.: US 9,327,432 B2
(45) Date of Patent: May 3, 2016

(54) POUCH FOR RECHARGEABLE BATTERY, FABRICATING METHOD OF THE SAME, AND RECHARGEABLE BATTERY INCLUDING THE POUCH

(75) Inventors: Jun-Sik Kim, Yongin-si (KR);
Dong-Hyun Kang, Yongin-si (KR);
Chong-Hoon Lee, Yongin-si (KR);
Yong-Kyun Park, Yongin-si (KR);
Sung-Soo Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 371 days.

(21) Appl. No.: 12/962,628

(22) Filed: Dec. 7, 2010

(65) Prior Publication Data

US 2011/0287308 A1   Nov. 24, 2011

(30) Foreign Application Priority Data

May 24, 2010   (KR) ........................ 10-2010-0048119

(51) Int. Cl.
| | | |
|---|---|---|
| *H01M 2/04* | (2006.01) | |
| *B29C 43/18* | (2006.01) | |
| *H01M 2/02* | (2006.01) | |
| *B32B 1/00* | (2006.01) | |
| *B32B 3/02* | (2006.01) | |

(Continued)

(52) U.S. Cl.
CPC . *B29C 43/18* (2013.01); *B32B 1/00* (2013.01); *B32B 3/02* (2013.01); *H01M 2/0207* (2013.01); *H01M 2/0287* (2013.01); *H01M 2/0292* (2013.01); *H01M 2/0456* (2013.01); *H01M 2/0469* (2013.01); *H01M 2/0491* (2013.01); *B29K 2705/00* (2013.01); *B29L 2031/7146* (2013.01); *B32B 2307/206* (2013.01); *B32B 2439/40* (2013.01)

(58) Field of Classification Search
CPC   H01M 2/0207; H01M 2/0217; H01M 10/647
USPC .......................................... 429/176
See application file for complete search history.

(56) References Cited

U.S. PATENT DOCUMENTS 6,387,567 B1 *  5/2002  Noh .............................. 429/211
7,048,822 B2    5/2006  Yamashita et al.

(Continued)

FOREIGN PATENT DOCUMENTS

| KR | 10-2001-0069369 | 7/2001 |
|---|---|---|
| KR | 10-0374989 B1 | 3/2003 |

(Continued)

OTHER PUBLICATIONS

KIPO Office Action dated Aug. 27, 2011 for KR Application No. 10-2010-0048119 (4 pages).

(Continued)

*Primary Examiner* — Ula C Ruddock
*Assistant Examiner* — Lisa S Park
(74) *Attorney, Agent, or Firm* — Lewis Roca Rothgerber Christie LLP

(57) ABSTRACT

A pouch for a rechargeable battery having stability by ensuring durability, a manufacturing method thereof, and a rechargeable battery including the same. The pouch includes a case having an opening and including a bottom surface portion, a side portion located along a periphery of the bottom surface portion and including at least one step portion, and a sealing portion located along a periphery of the side portion, and a cover configured to cover the opening of the case.

16 Claims, 7 Drawing Sheets

(51) Int. Cl.
*B29K 705/00* (2006.01)
*B29L 31/00* (2006.01)

(56) References Cited

U.S. PATENT DOCUMENTS

| | | | |
|---|---|---|---|
| 7,105,248 B2 * | 9/2006 | Yageta et al. | 429/162 |
| 2003/0118900 A1 * | 6/2003 | Otohata | H01M 2/0207 429/162 |
| 2008/0292913 A1 * | 11/2008 | Hong et al. | 429/7 |
| 2009/0075168 A1 * | 3/2009 | Lee | 429/176 |
| 2009/0191450 A1 | 7/2009 | Kim | |
| 2009/0311592 A1 * | 12/2009 | You et al. | 429/162 |

FOREIGN PATENT DOCUMENTS

| | | |
|---|---|---|
| KR | 10-2005-0020357 A | 3/2005 |
| KR | 10-2008-0041113 | 5/2008 |
| KR | 10-2009-0028243 | 3/2009 |
| KR | 10-2008-0007508 | 7/2009 |
| KR | 10-0917736 B1 | 9/2009 |
| KR | 10-0922441 B1 | 10/2009 |
| KR | 10-0973311 B1 | 7/2010 |
| WO | WO2010/025773 * | 3/2010 |

OTHER PUBLICATIONS

Korean Patent Abstracts, Publication No. 1020010069369, dated Jul. 25, 2001, in the name of Jeon Ho Lee et al, corresponding to Korean Patent 10-0374989 B1 listed above.

Korean Patent Abstracts, Publication No. 1020090028243, dated Mar. 18, 2009, in the name of Young Woo Lee, corresponding to Korean Patent 10-0917736 B1 listed above.

Korean Patent Abstracts, Publication No. 1020080041113, dated May 9, 2008, in the name of Hyun Chul Jung et al, corresponding to Korean Patent 10-0922441 B1 listed above.

\* cited by examiner (a)  (b)

(c)  (d)

POUCH FOR RECHARGEABLE BATTERY, FABRICATING METHOD OF THE SAME, AND RECHARGEABLE BATTERY INCLUDING THE POUCH

CROSS-REFERENCE TO RELATED APPLICATION

This application claims priority to and the benefit of Korean Patent Application No. 10-2010-0048119 filed in the Korean Intellectual Property Office on May 24, 2010, the entire contents of which are incorporated herein by reference.

BACKGROUND (a) Field

Embodiments of the present invention relate to a pouch and a rechargeable battery, and a manufacturing method thereof.

(b) Description of Related Art

Rechargeable batteries can be discharged and recharged, unlike primary batteries, which are not designed to be recharged. Small capacity rechargeable batteries are used for small portable electronic devices such as mobile phones, laptop computers, and camcorders, while large capacity batteries are widely used as power sources for driving motors of hybrid vehicles, etc.

The rechargeable battery includes an electrode assembly made of a positive electrode, a negative electrode, and a separator and a case receiving it, and may be classified into a cylindrical type, a prismatic type, a pouch type, etc., according to a shape thereof. Among them, the pouch type rechargeable battery may be easily formed into various exterior shapes and has a small weight such that the pouch may be made of a laminate sheet that is generally used as the exterior of a lithium-ion rechargeable battery.

The pouch forming an exterior made of the laminate sheet may be formed with a press. For example, the laminate sheet is placed on a mold, and then the laminate sheet is pressed by a punch and is elongated (e.g., stretched) to form the pouch.

Here, the corner portion of the pouch contacting the edge portion of the punch while the laminate sheet is elongated (e.g., stretched) is thinner than the remaining portion. As described above, if the laminate sheet is thin when forming the pouch, it is difficult to ensure durability such that it is difficult to ensure the safety of the electrode assembly received in the pouch.

The above information disclosed in this Background section is only for enhancement of understanding of the background of the invention, and therefore it may contain information that does not form the prior art that is already known in this country to a person of ordinary skill in the art.

SUMMARY

Embodiments of the present invention provide a pouch for a rechargeable battery that is capable of ensuring durability.

Embodiments of the present invention also provide a manufacturing method of a pouch for a rechargeable battery that is capable of ensuring durability.

Embodiments of the present invention further provide a rechargeable battery including a pouch that is capable of receiving an electrode assembly while ensuring durability.

A pouch for a rechargeable battery, the pouch according to an exemplary embodiment of the present invention includes a case having an opening and including a bottom surface portion, a side portion located along a periphery of the bottom surface portion and including at least one step portion, and a sealing portion located along a periphery of the side portion, and a cover configured to cover the opening of the case.

A thickness of an edge where the side portion and the bottom surface portion meet may be more than about 50% of a thickness of the sealing portion.

A height from the bottom surface portion to the sealing portion may be in a range of more than about 6 mm to less than about 18 mm.

The step portion may be substantially parallel to the bottom surface portion.

The step portion may be slanted with respect to the bottom surface portion.

The side portion may include a plurality of slanted surfaces with respect to the step portion, and angles between the plurality of slanted surfaces and a vertical line that is perpendicular to the bottom surface portion may be different from one another.

The side portion may include a plurality of slanted surfaces with respect to the step portion, and angles between the plurality of slanted surfaces and a vertical line that is perpendicular to the bottom surface portion may be in a range of more than about 0.5° to less than about 45°.

An angle between a vertical line that is perpendicular to the bottom surface portion and an imaginary slanted surface connecting a first edge where the side portion and the sealing portion meet and a second edge where the side portion and the bottom surface portion meet may be in a range of more than about 2° to less than about 45°.

The case and the cover may each include a laminate sheet including a polymer coated on both surfaces of a metal film.

The cover may include a second bottom surface portion, a second side portion located along a periphery of the second bottom surface portion and including at least one second step portion, and a second sealing portion located along a periphery of the second side portion.

A manufacturing method of a pouch for a rechargeable battery according to an exemplary embodiment of the present invention includes forming a laminate sheet by coating a polymer on both surfaces of a metal film, placing the laminate sheet on a first mold and pressing the laminate sheet by using a first punch on a side of the laminate sheet opposite the first mold to form the laminate sheet having a first formation, and placing the laminate sheet having the first formation on a second mold and pressing the laminate sheet having the first formation by using a second punch on a side of the laminate sheet having the first formation opposite the second mold to form the laminate sheet having a second formation.

A thickness of an edge where a side portion and a bottom surface portion of the pouch meet may be more than about 50% of a thickness of the laminate sheet before forming the laminate sheet having the first formation.

A rechargeable battery according to an exemplary embodiment of the present invention includes an electrode assembly including a positive electrode, a negative electrode, and a separator interposed between the positive electrode and the negative electrode, and a pouch receiving the electrode assembly and including a case having an opening including a bottom surface portion, a side portion located along a periphery of the bottom surface portion and including at least one step portion, and a sealing portion located along a periphery of the side portion, and a cover covering the opening of the case.

A thickness of an edge where the side portion and the bottom surface portion meet may be more than about 50% of a thickness of the sealing portion.

A height from the bottom surface portion to the sealing portion may be in a range of more than about 6 mm to less than about 18 mm.

The case and the cover may each include a laminate sheet including a polymer coated on both surfaces of a metal film.

The cover may include a second bottom surface portion, a second side portion located along a periphery of the second bottom surface portion and including at least one second step portion, and a second sealing portion located along a periphery on the second side portion.

According to an exemplary embodiment of the present invention, the durability of the pouch is ensured such that the electrode assembly may be stably received, and thereby the stability of the rechargeable battery may be ensured against an external impact.

Also, a pouch-type rechargeable battery may be manufactured with various sizes and shapes.

Further, the consumption amount of the laminate sheet to form the rechargeable battery having the same capacity may be reduced.

DETAILED DESCRIPTION

Figure 1:
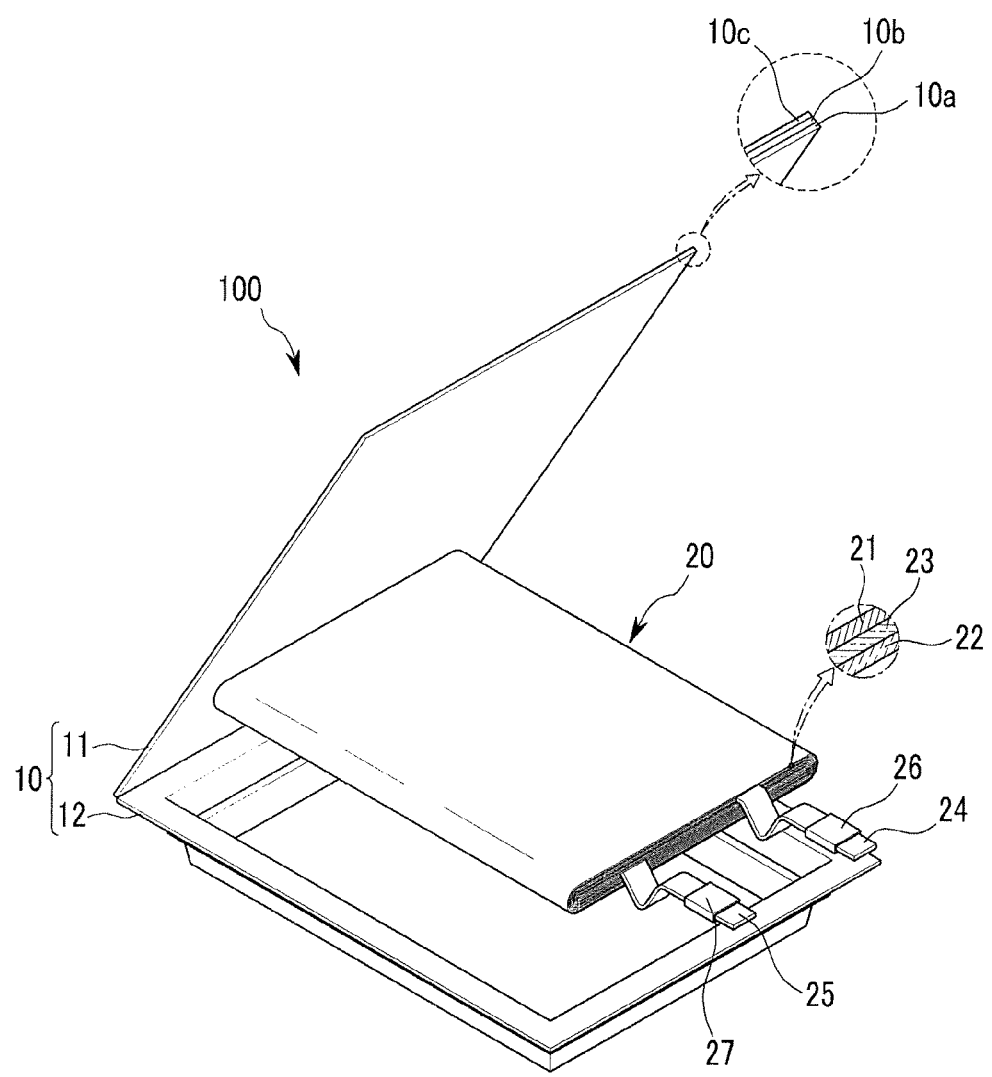
FIG. 1 is an exploded perspective view of a rechargeable battery according to a first exemplary embodiment of the present invention.

Hereinafter, the present invention will be described in more detail with reference to the accompanying drawings, in which exemplary embodiments of the invention are shown. In the specification and drawings, like reference numerals indicate like components, the size and inclination of each configuration shown in the drawings are exaggerated for better understanding and ease of description, and the present invention is not limited thereto.

Figure 2:
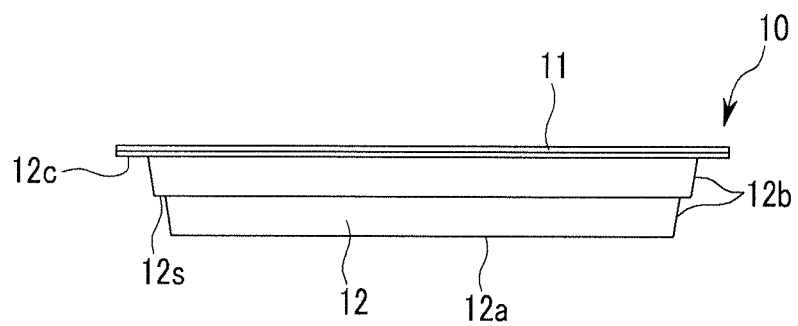
FIG. 2 is a side view of a pouch for a rechargeable battery according to the first exemplary embodiment of the present invention.

FIG. 1 is an exploded perspective view of a rechargeable battery according to a first exemplary embodiment of the present invention, and FIG. 2 is a side view of a pouch for a rechargeable battery according to the first exemplary embodiment of the present invention. Hereafter, a pouch 10 for a rechargeable battery and a rechargeable battery 100 including the same according to the first exemplary embodiment of the present invention will be described.

A rechargeable battery 100 according to one exemplary embodiment includes an electrode assembly 20 for executing charging and discharging, and a pouch 10 in which the electrode assembly 20 is installed. The pouch 10 includes a case 12 receiving the electrode assembly 20 and a cover 11 covering the upper portion of the case 12. The case 12 includes a receiving portion including a bottom surface portion 12a and a side portion 12b for the electrode assembly 20 to be received, and a sealing portion 12c joining the cover 11 after the electrode assembly 20 is received. The case 12 and the cover 11 join each other, thereby forming the substantially entire exterior of the rechargeable battery 100. In one exemplary embodiment, the pouch 10 is formed of a laminate sheet having a multi-layer structure of which a polymer, or polymers, 10a and 10c are coated on both surfaces of a metal film 10b. However, the present invention is not limited by the structure of the pouch, and the structure of the pouch may be variously amended or changed by a person of ordinary skill in the art.

In one exemplary embodiment, the electrode assembly 20 includes a positive electrode 21, a negative electrode 22, and a separator 23 located between the positive electrode 21 and the negative electrode 22. For example, the electrode assembly 20 is formed in a jelly-roll structure in which the positive electrode 21 and the negative electrode 22 having a belt shape are spiral-wound with the separator 23 interposed therebetween.

The positive electrode 21 includes a positive electrode coated portion coated with positive electrode active material, and a positive electrode uncoated portion where the positive electrode active material is not coated. Further, the negative electrode 22 includes a negative electrode coated portion coated with negative electrode active material, and a negative electrode uncoated portion where the negative electrode active material is not coated. In the positive electrode uncoated portion and the negative electrode uncoated portion, a positive electrode tab 24 and a negative electrode tab 25 are respectively formed, and the positive electrode tab 24 and the negative electrode tab 25 protrude from the electrode assembly 20 in a direction perpendicular to a direction in which the electrode assembly 20 is spiral-wound. However, the structure of the electrode assembly of the present invention is not limited by the jelly-roll shape, and an electrode assembly of other shapes, such as, for example, a stacked-type electrode assembly, may be formed.

When the electrode assembly 20 is installed in the pouch 10 and is sealed, the positive electrode tab 24 and the negative electrode tab 25 are protruded to one side of the pouch 10. Here, insulation layers 26 and 27 may be additionally formed for insulation of the portion where the pouch 10 and the electrode tabs 24 and 25 contact each other. The insulation layers 26 and 27 each enclose a portion of the respective electrode tabs 24 and 25 such that direct contact between the electrode tabs 24 and 25 and the pouch 10 is prevented. The insulation layers 26 and 27 may help sealing in the contact portion, as well as having the function of preventing a short circuit. On the other hand, to enhance cohesion between the polymer 10a forming the inner surface of the pouch 10 and the electrode tabs 24 and 25 or the insulation layers 26 and 27, the surface of the polymer 10a may include a component having an excellent cohesion property.

Generally, when forming the pouch, a process of pressing the laminate sheet is used, and the laminate sheet is elongated (e.g., stretched) to form the receiving portion for receiving the electrode assembly 20. Here, the edge portion where the side portion 12b and the bottom surface portion 12a meet in the receiving portion has a high elongation (e.g., stretching) rate such that the thickness thereof is relatively thinner than other portions.

Figure 3:
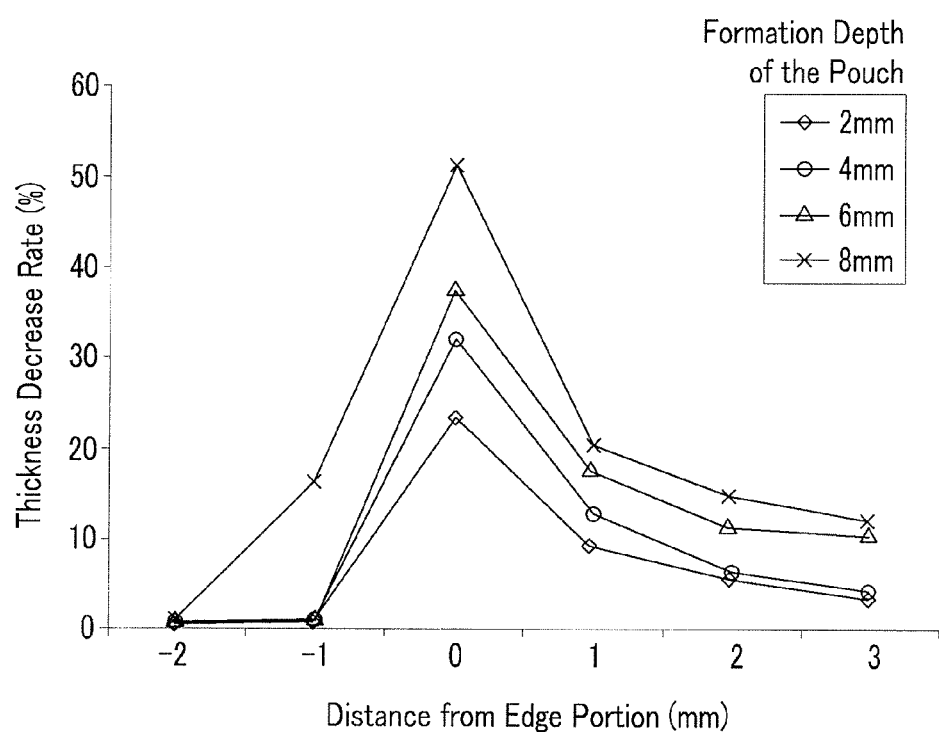
FIG. 3 is a graph showing a reduction of thickness according to formation depth of a pouch for a rechargeable battery.

FIG. 3 is a graph of a thickness decrease rate according to formation depth of the pouch when forming the pouch through a press process. Here, the formation depth of the pouch refers to the depth in the direction perpendicular to the bottom surface of the receiving portion. Also, in the graph, the x-axis is a relative position of the elongated (e.g., stretched) laminate sheet when the position of the edge is "0", and the y-axis shows a thickness decrease rate (e.g., a decrease rate of the thickness, or a reduction of the thickness) as a percentage. Referring to FIG. 3, comparing the thickness decrease rate when the formation depths of the pouch are 2 mm, 4 mm, 6 mm, and 8 mm, the thickness decrease rate is increased as the formation depth is increased. Particularly, when the formation depth is 6 mm, the thickness decrease rate is close to 40%, and when it is 8 mm, the thickness decrease rate is over 50%. On the other hand, when considering the durability of the pouch and the stability of the received electrode assembly, it may be desirable that the thickness of the edge under the maximum elongation (e.g., stretching) is more than about 50% of the thickness of the laminate sheet before the elongation (e.g., stretching), and in the case that the formation depth is more than about 6 mm when considering a process error, the thickness decrease rate may not satisfy the desired condition.

From this, to realize a battery of a large size, in the case of a rechargeable battery having a large depth of the pouch, such as about 6 mm, the thickness is further decreased at the edge of the receiving portion receiving the electrode assembly such that the receiving portion of the pouch is weak against vibration and impact, and thereby it is difficult to ensure stability of the rechargeable battery.

However, when forming the receiving portion in the described exemplary embodiment, a step portion 12s is formed on the side portion 12b to form two slanted surfaces such that the thickness decrease rate may be reduced. That is, as shown in FIG. 2, two slanted surfaces having small depths are formed by forming the step portion 12s on the side portion such that the elongation (e.g., stretching) rate may be reduced in the edge portion where the side portion 12b and the bottom surface portion 12a meet, and thereby the thickness decrease rate may be relatively reduced compared to the other portion.

In FIG. 2, the step portion 12s is formed on the central part of the side portion 12b, however, the position of the step portion 12s is not limited thereto, and various changes are possible. The step portion 12s may be formed on the lower part of the side portion 12b such that the thickness decrease rate of the edge may be reduced, while the electrode assembly 20 may be fixed at the lower part of the receiving portion. Also, the step portion 12s may be formed on the side portion 12b to reduce the thickness decrease rate of the edge for the electrode tabs 24 and 25 of the electrode assembly 20 to be appropriately received.

As described above, according to one exemplary embodiment, the step portion 12s is formed on the side portion 12b to form two slanted surfaces, so the thickness decrease rate (e.g., the reduction of the thickness) of the edge portion may be reduced compared with a case in which the side portion is formed of one slanted surface. Particularly, in the case in which the depth of the pouch is large to realize a battery of a large size, the thickness decrease rate of the edge portion may be less than about 50%. Accordingly, the durability of the pouch 10 may be improved, and the stability of the rechargeable battery may be ensured. Also, the formation position of the step portion 12s may be variously changed such that the electrode assembly 20 or the electrode tabs 24 and 25 may be effectively received.

Next, exemplary variations according to exemplary embodiments will be described with reference to FIG. 4 and FIG. 5. In the exemplary variations, the features having the same construction as the first exemplary embodiment are simply described or a description thereof is omitted.

Figure 4:
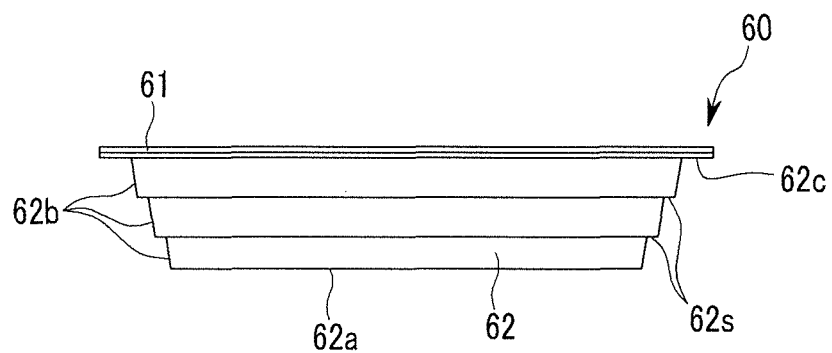
FIG. 4 is a side view of a pouch for a rechargeable battery according to an exemplary variation of the first exemplary embodiment of the present invention.

FIG. 4 is a side view of a pouch 60 for a rechargeable battery according to an exemplary variation of one exemplary embodiment. Referring to FIG. 4, a pouch 60 for a rechargeable battery according to one exemplary variation includes a cover 61 and a case 62, and the case 62 includes a receiving portion including a bottom surface portion 62a, a side portion 62b for receiving the electrode assembly, and a sealing portion 62c that is joined to the cover 61 after the electrode assembly is received.

In one exemplary embodiment shown in FIG. 4, two step portions 62s are formed on the side portion 62b of the receiving portion, and thereby three slanted surfaces are formed. As described above, the side portion 62b is formed with a multi-step structure such that the elongation (e.g., stretching) rate of the side portion 62b may be further uniform when forming the pouch 60, and the thickness decrease rate of the edge where the side portion 62b and the bottom surface portion 62a meet may be further reduced. Accordingly, the durability of the pouch 60 may be improved, and the stability of the rechargeable battery may be ensured.

Figure 5:
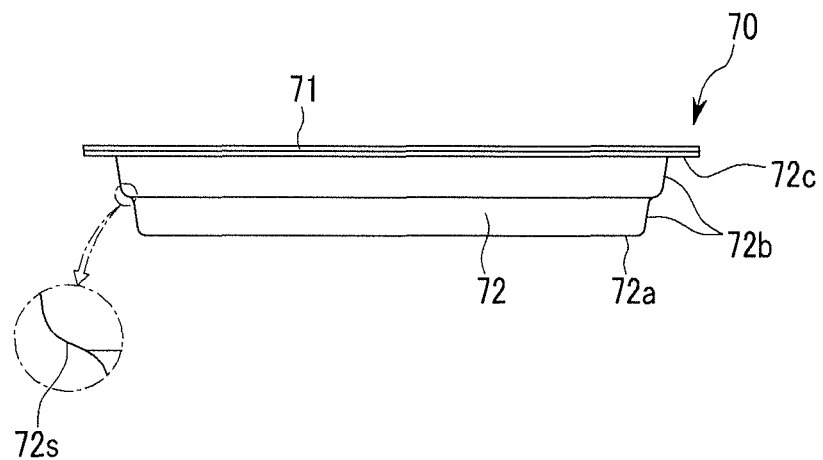
FIG. 5 is a side view of a pouch for a rechargeable battery according to another exemplary variation of the first exemplary embodiment of the present invention.

FIG. 5 is a side view of a pouch 70 for a rechargeable battery according to another exemplary variation of one exemplary embodiment. Referring to FIG. 5, a pouch 70 for a rechargeable battery according to one exemplary variation includes a cover 71 and a case 72, and the case 72 includes a receiving portion including a bottom surface portion 72a, a side portion 72b for receiving the electrode assembly, and a sealing portion 72c joined to the cover 71 after the electrode assembly is received.

In one exemplary embodiment, one step portion 72s is formed on the side portion 72b of the receiving portion, and thereby two slanted surfaces are formed. Here, differently from the previously described exemplary embodiments, the step portion 72s is not parallel to the bottom surface portion 72a of the receiving portion, but has an inflection point such that the two slanted surfaces are obliquely connected. As described above, the step portion 72s is obliquely formed on the side portion 72b such that the elongation (e.g., stretching) rate may be uniform at the edge of the portion where the step portion 72s is formed, and thereby the thickness decrease rate may be accordingly reduced. Also, two slanted surfaces are formed on the side portion 72b such that the elongation (e.g., stretching) rate of the entire side portion 72b may be uniform when forming the pouch 70, and the thickness decrease rate of the edge where the side portion 72b and the bottom surface portion 72a are met may also be decreased. Accordingly, the durability of the pouch 70 may be improved, and the stability of the rechargeable battery may be ensured.

In one exemplary embodiment, it is desirable that an inclination angle formed by the slanted surface and the depth formed by the slanted surface are determined in ranges (e.g., predetermined ranges), and this will be described with reference to FIG. 6. In the present specification, the inclination angle refers to an angle formed by the slanted surface of the side portion of the pouch and the vertical line that is perpendicular to the bottom surface portion, and the depth of the receiving portion or the depth of the slanted surface refers to a length in the direction that is perpendicular to the bottom surface portion.

Figure 6:
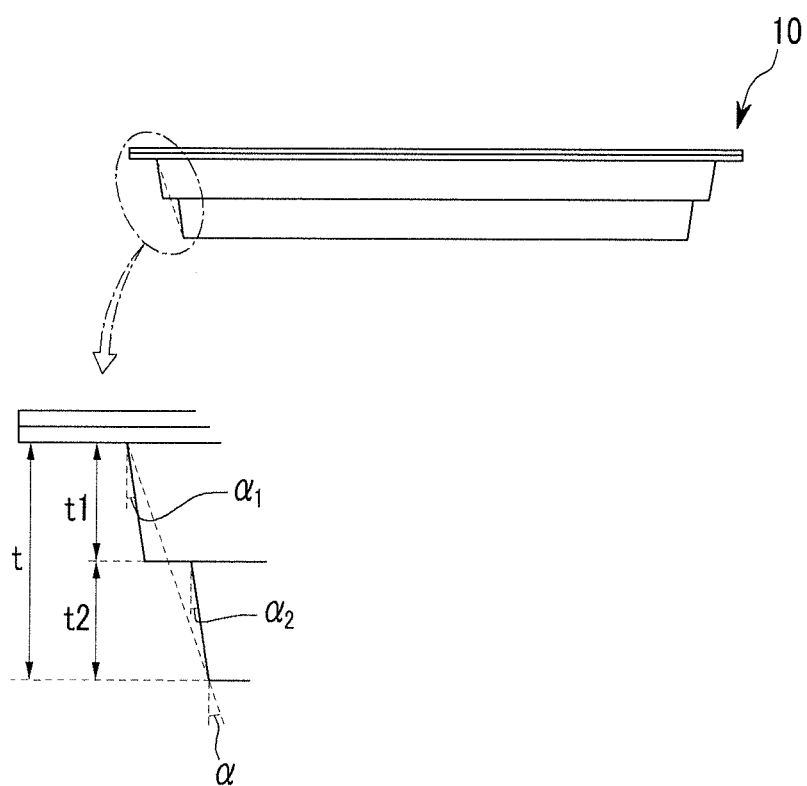
FIG. 6 is a view showing an elongated (e.g., stretched) slanted surface of a side portion of a pouch for a rechargeable battery according to the first exemplary embodiment of the present invention.

FIG. 6 is a side view of a pouch 10 for a rechargeable battery according to another exemplary variation of the first exemplary embodiment of the present invention and also shows an enlarged view of the slanted surface, and as shown in FIG. 6, the slanted surfaces formed on the side portion have inclination angles $\alpha_1$ and $\alpha_2$, respectively. Here, the inclination angles $\alpha_1$ and $\alpha_2$ may be equal to each other or may be different from each other according to the shape of the received electrode assembly or the electrode tab and the design parameters.

In one exemplary embodiment, the inclination angles $\alpha_1$ and $\alpha_2$ are in a range of more than about 0.5° to less than about 45°. When an inclination angle $\alpha_1$ or $\alpha_2$ is less than about 0.5°, it may be difficult to manufacture the case having such inclination angle $\alpha_1$ or $\alpha_2$, and the inclination angle $\alpha_1$ or $\alpha_2$ is close to vertical such that the thickness reduction of the edge is relatively increased. When an inclination angle $\alpha_1$ or $\alpha_2$ is more than about 45°, unnecessary space excluding the space for receiving the electrode assembly may exist. Also, when an entire inclination angle $\alpha$ is formed by a straight line, which connects the edge where the side portion and the sealing portion meet and the edge where the side portion and the bottom surface portion meet, and a vertical line that is perpendicular to the bottom surface, the entire inclination angle $\alpha$ is formed in the range of more than about 2° to less than about 45°. When an inclination angle $\alpha_1$ or $\alpha_2$ is less than about 2°, it is difficult to manufacture the case having such entire inclination angle $\alpha$ and the thickness reduction of the edge is relatively increased, and when an inclination angle $\alpha_1$ or $\alpha_2$ is more than about 45°, unnecessary space excluding the space for receiving the electrode assembly is increased such that the receiving of the electrode assembly is not efficient.

Also, the slanted surface has depths $t_1$ and $t_2$, and when the depths $t_1$ and $t_2$ are less than about 0.5 mm, it is difficult to manufacture the case having such depth, and the process efficiency may be deteriorated such that the depths $t_1$ and $t_2$ are formed to be more than about 0.5 mm. Also, the entire depth t of the receiving portion of the pouch may be represented as the sum of $t_1$ and $t_2$, and in the one exemplary embodiment, to increase or maximize the effect forming the step portion it is desirable that the entire depth t is more than about 6 mm and less than about 18 mm. As described above, when the entire depth t is more than about 6 mm, if the step portion is not formed, the thickness decrease rate of the edge portion is large, and to suppress this problem, when the entire depth t is more than about 6 mm, it is desirable that the pouch structure of described exemplary embodiment is applied. Also, when the entire depth t is over about 18 mm, the thickness of the laminate sheet becomes thin such that the strength of the pouch exterior is deteriorated and reliability is decreased.

As described above, the range of the inclination angles $\alpha_1$ and $\alpha_2$ and the depths $t_1$ and $t_2$ of the side portion in the pouch 10 is described for the formation of one step portion, however this can also be applied to the case in which a plurality of step portions are formed, as shown in FIG. 4. That is, when the plurality of step portions are formed, it is desirable that the inclination angles $\alpha_1$ and $\alpha_2$ of the slanted surface are more than about 0.5° and that the entire inclination angle $\alpha$ is more than about 2° and less than about 45°. Also, it is desirable that the depth of each slanted surface is more than about 0.5 mm, and that the structure in which the step portion is applied to the case has an entire depth of more than about 6 mm.

Figure 7:
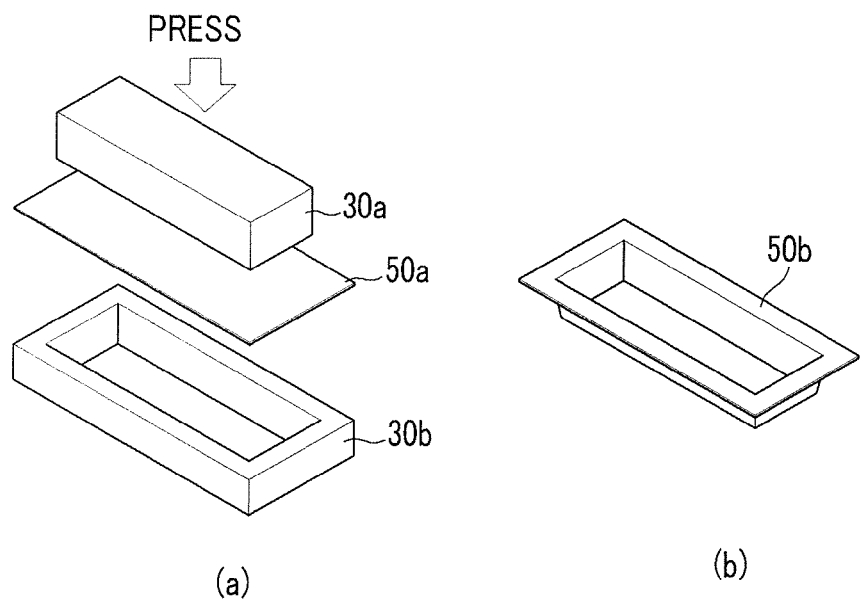
FIG. 7 is a view sequentially showing a manufacturing process of a pouch for a rechargeable battery according to the first exemplary embodiment of the present invention.
Figure 7:
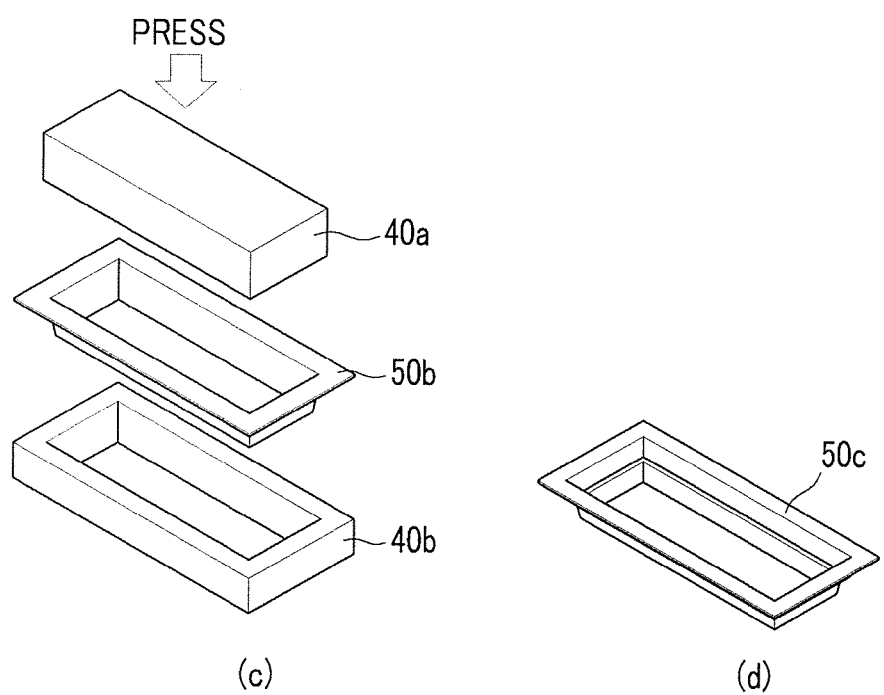

FIG. 7 is a view sequentially showing a manufacturing process of a pouch for a rechargeable battery according to the first exemplary embodiment of the present invention, and hereafter the manufacturing process will be described with reference to this.

Firstly, as shown in FIG. 7 (a), a laminate sheet 50a of which both surfaces of a metal film are coated with a polymer, or polymers, is provided, and it is placed on a first mold 30b. Next, the laminate sheet 50a is pressed by using a first punch 30a on the opposite side of the first mold 30b. Through this process, as shown in FIG. 7 (b), a laminate sheet 50b having a pouch shape is formed.

Referring to FIG. 7 (c), the laminate sheet 50b having the pouch shape is placed on a second mold 40b and is pressed by using a second punch 40a on the opposite side of the second mold 40b. Accordingly, as shown FIG. 7 (d), a laminate sheet 50c having a pouch shape in which the step portion is formed on the side portion is formed. Next, a cover covering an upper opening is formed to complete the pouch, and an electrode assembly is installed (e.g., placed or received) therein to complete the rechargeable battery.

Here, the first mold 30b and the first punch 30a may be again used as the second mold 40b and the second punch 40a, and/or a mold and a punch having a smaller size than the first mold 30b and the first punch 30a may be used. The shape and the size of the step portion of the side portion may be determined according to the size of the second mold 40b and the second punch 40a or the size of the first mold 30b and the first punch 30a, and they may be determined through considering the capacity of the desired rechargeable battery and the size of the pouch.

As described above, the pouch of a large size is required for the manufacture of a battery of a large size, and the plurality of step portions may be formed through considering the thickness decrease rate according to the depth of the pouch, and for this purpose, the above-described processes may be repeated. However, the process efficiency may be deteriorated as the number of step portions is increased, and accordingly, an appropriate number of step portions are formed.

The pouch is formed by this process such that the durability of the pouch may be ensured, and the electrode assembly may be stably received. Also, the size and the shape of the pouch-type rechargeable battery may be variously formed by changing the size and the shape of the mold and the punch. Also, the step portion is additionally formed when forming the rechargeable battery with the same capacity such that a slight reduction of the laminate sheet may be expected.

Figure 8:
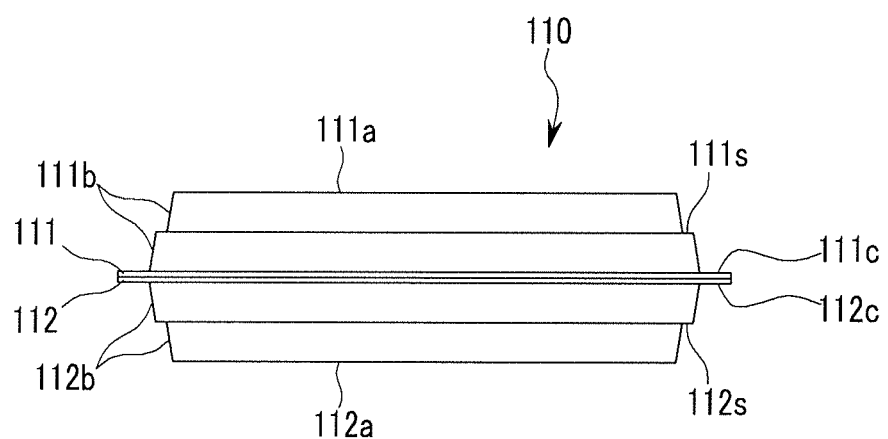
FIG. 8 is a side view of a pouch for a rechargeable battery according to a second exemplary embodiment of the present invention.

FIG. 8 is a side view of a pouch according to a second exemplary embodiment of the present invention, and a pouch according to one exemplary embodiment will be described with reference to this.

A pouch 110 according to the second exemplary embodiment includes a cover 111 and a case 112 like the first exemplary embodiment, and the case 112 includes a first receiving portion including a first bottom surface portion 112a and a first side portion 112b receiving the electrode assembly and a first sealing portion 112c.

However, in the second exemplary embodiment, the cover 111 is not flat, but is formed with substantially the same shape as the case 112, thereby being symmetrically attached thereto. That is, the cover 111 includes a second receiving portion including a second bottom surface portion 111a and a second side portion 111b as well as a second sealing portion 111c, and the cover 111 and the case 112 are joined at the sealing portions 111c and 112c.

In the second exemplary embodiment, the case 112 and the cover 111 respectively have a plurality of slanted surfaces where step portions 112s and 111s are formed on the first and second side portions 112b and 111b. The manufacturing method thereof is substantially the same as the method for forming the pouch according to the first exemplary embodiment.

As described above, the step portion 112s or 111s is formed in the side portion 112b or 111b such that the thickness reduction of the edge may be decreased through the structure of the case 112 and the cover 111 including the plurality of slanted surfaces. Accordingly, the durability of the pouch 110 may be improved, and the stability of the rechargeable battery may be ensured. Also, the cover 111 is formed with the same shape as the case 112 such that the space for receiving the electrode assembly may be sufficiently ensured, and as a result, a large electrode assembly may be received to realize a battery of a large size.

The present invention is described through exemplary embodiments and exemplary variations, however the present invention is not limited by the exemplary embodiments and the exemplary variations. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and their equivalents.

| Description of Some Reference Numerals | |
|---|---|
| 100: rechargeable battery | 10, 60, 70, 110: pouch |
| 11, 61, 71, 111: cover | 12, 62, 72, 112: case |
| 12a, 62a, 72a, 111a 112a: bottom surface portion | |
| 12b, 62b, 72b, 111b, 112b: side portion | |
| 12s, 62s, 72s, 111s, 112s: step portion | 20: electrode assembly |
| 30a, 40a: punch | 30b, 40b: mold |
| 50a, 50b, 50c: laminate sheet | |

What is claimed is:

1. A pouch for a rechargeable battery, the pouch comprising:
    a case having an opening and comprising:
        a bottom surface portion;
        an integral side portion located along a periphery of the bottom surface portion and comprising a first side portion, a second side portion, a third side portion, a first step portion, and a second step portion;
        an edge where the side portion and the bottom surface portion meet; and
        a sealing portion located along a periphery of the internal side portion; and
    a cover configured to contact the sealing portion to cover the opening of the case,
    wherein the first side portion is between the edge and the first step portion,
    wherein the first step portion is between the first side portion and the second side portion,
    wherein the second side portion is between the first step portion and the second step portion,
    wherein the second step portion is between the second side portion and the third side portion,
    wherein the third side portion is between the second step portion and the sealing portion,
    wherein the first step portion and the second step portion are substantially parallel to each other.

2. The pouch of claim 1, wherein a height from the bottom surface portion to the sealing portion is in a range of more than about 6 mm to less than about 18 mm.

3. The pouch of claim 1, wherein the step portions are substantially parallel to the bottom surface portion.

4. The pouch of claim 1, wherein the step portions are slanted with respect to the bottom surface portion.

5. The pouch of claim 1, wherein the internal side portion comprises a plurality of slanted surfaces with respect to the step portion, and angles between the plurality of slanted surfaces and a vertical line that is perpendicular to the bottom surface portion are different from one another.

6. The pouch of claim 1, wherein the internal side portion comprises a plurality of slanted surfaces with respect to the step portion, and angles between the plurality of slanted surfaces and a vertical line that is perpendicular to the bottom surface portion are in a range of more than about 0.5° to less than about 45°.

7. The pouch of claim 1, wherein an angle between a vertical line that is perpendicular to the bottom surface portion from a first point on the edge and a line from the first point to a second point where the internal side portion and the sealing portion meet is in a range of more than about 2° to less than about 45°.

8. The pouch of claim 1, wherein the case and the cover each comprise a laminate sheet comprising a polymer coated on both surfaces of a metal film.

9. The pouch of claim 1, wherein the cover comprises
    a second bottom surface portion;
    a second side portion located along a periphery of the second bottom surface portion and comprising at least one second step portion; and
    a second sealing portion located along a periphery of the second side portion.

10. A rechargeable battery comprising:
    an electrode assembly comprising:
        a positive electrode;
        a negative electrode; and
        a separator interposed between the positive electrode and the negative electrode; and
    a pouch receiving the electrode assembly and comprising:
        a case having an opening and comprising:
            a bottom surface portion;
            an integral side portion located along a periphery of the bottom surface portion and comprising a first side portion, a second side portion, a third side portion, a first step portion and a second step portion;
            an edge where the side portion and the bottom surface portion meet; and
            a sealing portion located along a periphery of the internal side portion; and
        a cover contacting the sealing portion and covering the opening of the case,
    wherein the first side portion is between the edge and the first step portion,
    wherein the first step portion is between the first side portion and the second side portion,
    wherein the second side portion is between the first step portion and the second step portion,
    wherein the second step portion is between the second side portion and the third side portion,
    wherein the third side portion is between the second step portion and the sealing portion,
    wherein the first step portion and the second step portion are substantially parallel to each other.

11. The rechargeable battery of claim 10, wherein a height from the bottom surface portion to the sealing portion is in a range of more than about 6 mm to less than about 18 mm.

12. The rechargeable battery of claim 10, wherein the case and the cover each comprise a laminate sheet comprising a polymer coated on both surfaces of a metal film.

13. The rechargeable battery of claim 10, wherein the cover comprises:
- a second bottom surface portion;
- a second side portion located along a periphery of the second bottom surface portion and comprising at least one second step portion; and
- a second sealing portion located along a periphery on the second side portion.

14. The rechargeable battery of claim 1, wherein the step portions are substantially parallel to the opening.

15. The rechargeable battery of claim 1, wherein the sealing portion and the side portion consist of a same laminate sheet.

16. The pouch of claim 1, wherein a height from the bottom surface portion to the sealing portion is in a range of more than about 6 mm to less than about 8 mm.

\* \* \* \* \*